(12) United States Patent
Hallek

(10) Patent No.: US 10,281,566 B2
(45) Date of Patent: May 7, 2019

(54) ULTRASONIC SENSOR DEVICE FOR A MOTOR VEHICLE, MOTOR VEHICLE AND CORRESPONDING METHOD

(71) Applicant: VALEO Schalter und Sensoren GmbH, Bietigheim-Bissingen (DE)

(72) Inventor: Michael Hallek, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 379 days.

(21) Appl. No.: 15/104,357

(22) PCT Filed: Nov. 21, 2014

(86) PCT No.: PCT/EP2014/075241
§ 371 (c)(1),
(2) Date: Jun. 14, 2016

(87) PCT Pub. No.: WO2015/090844
PCT Pub. Date: Jun. 25, 2015

(65) Prior Publication Data
US 2016/0313438 A1 Oct. 27, 2016

(30) Foreign Application Priority Data
Dec. 17, 2013 (DE) .......................... 10 2013 021 328

(51) Int. Cl.
*G01S 7/00* (2006.01)
*G01S 7/52* (2006.01)
(Continued)

(52) U.S. Cl.
CPC .......... *G01S 7/52004* (2013.01); *G01S 7/529* (2013.01); *G01S 15/876* (2013.01); *G01S 15/931* (2013.01);
(Continued)

(58) Field of Classification Search
USPC .......................................................... 367/13
See application file for complete search history.

(56) References Cited

U.S. PATENT DOCUMENTS 5,631,875 A * 5/1997 Romes .................... G01S 7/527
367/98
6,040,765 A 3/2000 Cherry et al.
(Continued)

FOREIGN PATENT DOCUMENTS

DE 2 33 360 A1 2/1986
DE 42 08 595 A1 5/1993
(Continued)

OTHER PUBLICATIONS

International Search Report issued in PCT/EP2014/075241 dated Feb. 24, 2015 (3 pages).
(Continued)

*Primary Examiner* — James R Hulka
(74) *Attorney, Agent, or Firm* — Osha Liang LLP

(57) ABSTRACT

The invention relates to an ultrasonic sensor device for a motor vehicle, comprising a membrane (11) for transmitting and receiving ultrasonic waves, comprising an excitation element (12) designed for providing an electrical reception signal upon reception of the ultrasonic waves and also for exciting the membrane (11) for transmitting the ultrasonic waves, comprising a transmitter (13) for emitting electrical pulses to the excitation element (12) and comprising a receiver (16) for receiving and conditioning the electrical reception signal, wherein the ultrasonic sensor device (2) comprises a diagnosis unit (22), which is designed to carry out a diagnosis of the receiver (16) and in the process to check the receiver (16) with regard to its functionality.

11 Claims, 4 Drawing Sheets

(51) Int. Cl.
  *G01S 15/93* (2006.01)
  *G01S 7/529* (2006.01)
  *G01S 15/87* (2006.01)

(52) U.S. Cl.
  CPC ... *G01S 2015/932* (2013.01); *G01S 2015/938* (2013.01)

(56) References Cited

U.S. PATENT DOCUMENTS

| | | | | |
|---|---|---|---|---|
| 6,445,337 B1* | 9/2002 | Reiche | ............ | G01S 13/60 180/197 |
| 7,012,561 B2* | 3/2006 | Toennesen | ............ | G01S 13/582 342/130 |
| 8,059,488 B2* | 11/2011 | Reiche | ............ | G01S 15/931 367/135 |
| 8,107,322 B2* | 1/2012 | Reiche | ............ | B06B 1/0215 367/135 |
| 8,671,762 B2* | 3/2014 | Reiche | ............ | G10K 9/22 73/633 |
| 9,702,974 B2* | 7/2017 | Hallek | ............ | G01S 7/527 |
| 2005/0116855 A1* | 6/2005 | Toennesen | ............ | G01S 13/582 342/70 |
| 2005/0180530 A1* | 8/2005 | Reiche | ............ | G01S 7/52004 375/317 |
| 2009/0180352 A1* | 7/2009 | Reiche | ............ | G01S 7/523 367/140 |
| 2010/0296692 A1* | 11/2010 | Reiche | ............ | G01S 7/521 381/423 |
| 2011/0102114 A1* | 5/2011 | Reiche | ............ | B06B 1/0215 333/81 R |
| 2011/0259107 A1* | 10/2011 | Reiche | ............ | G10K 9/22 73/633 |
| 2011/0280106 A1* | 11/2011 | Reiche | ............ | G01S 7/526 367/100 |
| 2013/0142011 A1* | 6/2013 | Hallek | ............ | G01S 7/527 367/87 |
| 2014/0026396 A1* | 1/2014 | Reiche | ............ | G01S 7/521 29/594 |
| 2014/0247161 A1* | 9/2014 | Hallek | ............ | G01S 7/524 340/932.2 |
| 2016/0223658 A1* | 8/2016 | Hallek | ............ | G01S 15/931 |
| 2016/0297372 A1* | 10/2016 | Hallek | ............ | G01S 15/931 |
| 2017/0045611 A1* | 2/2017 | Gunzel | ............ | G01S 15/931 |

FOREIGN PATENT DOCUMENTS

| | | | | |
|---|---|---|---|---|
| DE | 42 13 121 C1 | 10/1993 | | |
| DE | 10247971 A1 | 5/2004 | | |
| DE | 10 2011 121092 A1 | 6/2013 | | |
| DE | 102011121092 A1 * | 6/2013 | ............ | G01S 7/003 |
| DE | 10 2012 201920 A1 | 8/2013 | | |
| DE | 102012201920 A1 * | 8/2013 | ......... | G01S 7/52004 |
| EP | 2 124 070 A2 | 11/2009 | | |
| JP | S60-73385 A | 4/1985 | | |
| JP | S60-181673 A | 9/1985 | | |
| JP | H0415424 B2 | 3/1992 | | |
| JP | H08-327732 A | 12/1996 | | |
| JP | 2013-221755 A | 10/2013 | | |
| WO | WO-2013117439 A1 * | 8/2013 | ......... | G01S 7/52004 |

OTHER PUBLICATIONS

Written Opinion of the International Searching Authority issued in PCT/EP2014/075241 dated Feb. 24, 2015 (8 pages).
German Search Report issued in DE 10 2013 021 328.2, dated Mar. 7, 2014 (5 pages).
Notification of Reason for Rejection issued in corresponding Japanese Application No. 2016-540687, dated Jun. 30, 2017 (13 pages).
Notification of Reason for Rejection issued in corresponding Japanese Patent Application No. 2016-540687, dated Mar. 27, 2018 (9 pages).

* cited by examiner

ULTRASONIC SENSOR DEVICE FOR A MOTOR VEHICLE, MOTOR VEHICLE AND CORRESPONDING METHOD

The invention relates to an ultrasonic sensor device for a motor vehicle, comprising a membrane for transmitting and receiving ultrasonic waves, comprising an excitation element, for example a piezoelement, designed for providing an electrical reception signal upon reception of the ultrasonic waves and also for exciting the membrane for transmitting the ultrasonic waves, comprising a transmitter for emitting electrical pulses to the excitation element and comprising a receiver for receiving and conditioning the electrical reception signal. The invention additionally relates to a motor vehicle comprising such an ultrasonic sensor device, and also a method for operating an ultrasonic sensor device of a motor vehicle.

Ultrasonic sensors for motor vehicles are already known in diverse configurations from the prior art. They are usually used for supporting the driver when manoeuvring the motor vehicle, in particular when carrying out parking operations. In this case, the ultrasonic sensors are used to measure distances to obstacles situated in the surroundings of the motor vehicle. The ultrasonic sensors here belong to a driver assistance device, referred to as a parking aid. However, nowadays ultrasonic sensors are also being used more and more often outside this actual parking aid functionality, such as, for example, for driving support with active braking interventions, i.e. in automatic braking assistance systems, in blind spot monitoring systems, in autonomous cruise control systems, in collision detection systems and the like.

Ultrasonic sensors operate according to the echo propagation time principle: in ultrasonic technology the measurement of distance is carried out by means of an echo propagation time method or echo sounding method. The ultrasonic sensor transmits a transmission signal—ultrasound—and receives a reception signal, which is likewise a sound signal and corresponds to a signal component of the transmission signal that was transmitted and reflected at an obstacle. In other words, ultrasonic waves are transmitted, reflected from an object and received again by the same ultrasonic sensor and/or an adjacent ultrasonic sensor of the same motor vehicle and are evaluated. Depending on the measured propagation time of the ultrasonic wave, the distance and if appropriate also the relative position and/or a relative speed relative to the motor vehicle are then determined.

Diagnosis of an ultrasonic sensor is currently the focus of interest. Since present-day ultrasonic sensors are also used outside the actual parking aid functionality, such as, for example, for safeguarding the vehicle doors during opening, from the standpoint of functional reliability it is more and more important to identify a malfunction of an ultrasonic sensor. In this case, a general diagnosis of an ultrasonic sensor is known for example from the document DE 102 47 971 A1. Here the natural frequency and the decay time of the ultrasonic sensor are evaluated for identifying disturbances.

The conventional checking of the general functioning of an ultrasonic sensor usually takes place only within a control unit in the context of a plausibilization. The control unit checks for example said decay time or else the natural frequency of the sensor. A check is also made to establish whether a transmitted ultrasonic signal is present as an echo at the receiver. If this signal is present, the entire ultrasonic sensor is rated as functional, without a qualitative statement being made about the functioning of the respective components. Only a binary decision as to whether or not the entire ultrasonic sensor is functioning properly is possible on the basis of the decay time. The fact of whether, for example, the electrical reception signal is correctly conditioned, for example amplified, within the sensor cannot be detected in the control unit, since the sensor only communicates binary message pulses to the control unit if target echoes are detected. If the amplification of the reception signal is insufficient, however, such target echoes cannot be detected under certain circumstances, and the control unit nevertheless assumes correct functioning of the sensor.

It is an object of the invention to provide an ultrasonic sensor device, a motor vehicle and also a method in which measures are taken which enable a more extensive statement about the functionality of the ultrasonic sensor device.

This object is achieved according to the invention by means of an ultrasonic sensor device, by means of a motor vehicle and also by means of a method having the features according to the respective independent patent claims. Advantageous embodiments of the invention are the subject of the dependent patent claims, the description and the figures.

An ultrasonic sensor device according to the invention for a motor vehicle comprises a membrane serving for transmitting and receiving ultrasonic waves. An excitation element is designed for providing an electrical reception signal upon reception of the ultrasonic waves by the membrane. The excitation element also serves for exciting the membrane for transmitting the ultrasonic waves on account of electrical pulses which are provided by means of a transmitter and are emitted to the excitation element. A receiver serves for receiving and conditioning the electrical reception signal. The excitation element may be a piezoelectric element for example. The invention provides for the ultrasonic sensor device to comprise a diagnosis unit, which is designed to carry out a diagnosis of the receiver and thereby to check the receiver with regard to its functionality.

According to the invention, therefore, an explicit diagnosis of the receiver itself is carried out, such that specifically with regard to the receiver it is established whether the latter is functioning properly or else has a defect. In this regard, it may happen, for example, that, by evaluating the decay time of the membrane, although the entire device is rated as functional, the explicit diagnosis of the receiver reveals, for example, that an amplification of the electrical reception signal is faulty, for example too weak, on account of an internal fault of the receiver. Such situations can now be detected in the context of the separate diagnosis of the receiver and, if appropriate, fault messages can be output. Specifically, on the basis of the length of a message pulse communicated by the sensor, a control unit can only determine the general decay time of the membrane and check the general functionality of the sensor. It is only an internal diagnosis of the receiver, however, that enables more extensive statements about whether the entire ultrasonic sensor device is functioning as intended and target objects can thus be reliably detected.

In one embodiment it is provided that the receiver comprises an amplifier, in particular an analogue amplifier, for amplifying the electrical reception signal, and the diagnosis unit is designed to check the amplifier with regard to its functionality in the context of the diagnosis. It is thus possible to establish whether the amplifier can actually amplify the electrical reception signal with the required gain and the target objects in the surroundings of the motor vehicle can thus be reliably detected. If the electrical reception signal is not amplified with the required gain, then it may happen, specifically, that a received target echo of a real target object is below the so-called threshold value curve and thus cannot be detected by the ultrasonic sensor device. Such situations can be avoided by explicitly checking the amplifier.

Preferably, the diagnosis unit can check the amplifier with regard to the magnitude of its gain factor. It can thus be established whether the electrical reception signal can be amplified with the required gain magnitude and the target echoes can thus be reliably detected.

Preferably, the ultrasonic sensor device comprises a control unit and also an ultrasonic sensor separate from said control unit and having a sensor housing, in which the transmitter, the receiver and the diagnosis unit are arranged. A result of the diagnosis can then be communicated from the diagnosis unit to the control unit. This embodiment is based on the insight that in the prior art a message pulse is communicated from the ultrasonic sensors to the control unit, the length of said message pulse being directly dependent on the decay time of the membrane, and that only a binary decision as to whether or not the ultrasonic sensors operate can be taken on the basis of said length of the message pulse. It is only as a result of the integration of the diagnosis unit into the ultrasonic sensor and the sensor-internal diagnosis of the receiver that further statements can be made about whether and how well the receiver is actually functioning. The result of this diagnosis can then be communicated from the ultrasonic sensor to the control unit. The diagnosis can be initiated for example on the basis of a control signal of the control unit. By means of said control signal, the ultrasonic sensor can be switched for example to a specific diagnosis mode, which in particular is separate from normal operation and in which the diagnosis of the receiver is carried out. The diagnosis mode can be activated for example each time the ultrasonic sensor device is initialized or upon each boot process of the control unit, if in particular the ignition of the motor vehicle is activated.

In the context of the diagnosis, the diagnosis unit can drive the transmitter for outputting at least one electrical transmission pulse. The diagnosis unit can then evaluate a response signal output by the receiver in reaction to the at least one transmission pulse. The response or the reaction of the receiver to at least one electrical pulse is thus monitored or evaluated, whereby it is possible to draw conclusions about the functionality of the receiver, in particular the gain magnitude.

It proves to be particularly advantageous here if, in the context of the diagnosis, the diagnosis unit drives the transmitter for outputting at least two transmission pulses successively. The diagnosis of the receiver can thus be performed reliably since the response signal can also be evaluated with regard to a plurality of pulses.

The at least two transmission pulses preferably have different pulse lengths, and the diagnosis unit is preferably designed to check electrical pulses of the response signal of the receiver, said response signal being output in reaction to the at least two transmission pulses, with regard to their pulse lengths. It is thus possible to check whether the variation of the pulse lengths of the transmission pulses also results in a change in the pulse length of the pulses of the response signal and the reaction of the receiver to the at least two transmission pulses is correct. Faults of the receiver can be detected in this way.

Upon driving the transmitter for outputting the at least one transmission pulse, the diagnosis unit can preferably vary a gain factor of the amplifier of the receiver and check the response signal of the receiver, said response signal being output in reaction to the at least one transmission pulse, with regard to its magnitude. In particular, the gain factor of the amplifier is altered here with each transmission pulse. If a plurality of transmission pulses are output, the gain factor can be set to a different value for each transmission pulse. In this way, the gain magnitude of the amplifier can be checked without much complexity.

In this context, the diagnosis unit can set the gain factor to a minimum, i.e. to the minimum possible gain value, for at least one transmission pulse of the transmitter and/or to a maximum, i.e. to a maximum possible gain value, for at least one transmission pulse. On the basis of the response signal of the receiver it is thus possible to check whether the amplifier can be operated at its minimum gain factor and/or its maximum gain factor and the electrical reception signal can thus be reliably amplified.

If a plurality of transmission pulses are output, then the gain factor can be varied for example in a stepwise manner from the minimum to the maximum, wherein in particular the gain factor is altered in each case by one step with each transmission pulse.

The diagnosis can be performed in such a way that the transmitter is driven for emitting the at least one transmission pulse to the excitation element while the receiver is likewise electrically coupled to the excitation element. An electrical signal provided by the excitation element is thus present at the input of the receiver. From this electrical signal, the receiver then generates the abovementioned response signal on the basis of which the diagnosis is performed. As a result, it is also possible to detect faults in the path between transmitter and receiver, such as, in particular, faults of the excitation element and/or a torn membrane.

The ultrasonic sensor device can comprise a switch which is switchable back and forth between a first switching position, in which the output of the transmitter and the input of the receiver are electrically coupled to the excitation element, and a second switching position in which the input of the receiver is electrically connected directly to the output of the transmitter whilst bypassing the excitation element. The diagnosis unit can then drive the transmitter for emitting the at least one transmission pulse to the receiver in the second switching position of the switch—if the receiver is directly coupled to the transmitter. Such a switch makes it possible to differentiate reliably between faults of the receiver itself, on the one hand, and faults of the path between transmitter and receiver (excitation element and/or membrane).

This may be manifested for example such that, when carrying out the diagnosis, firstly the transmitter is driven for emitting at least one transmission pulse to the excitation element in one switching position—for example the first switching position—of the switch, in which for example both the transmitter and the receiver are connected to the excitation element. Only if this diagnosis detects a fault on the basis of the response signal is it possible for the transmitter then also to be driven in the other switching position of the switch for emitting at least one transmission pulse mentioned, for example directly to the receiver. In the normal case if no faults are detected in the first (or second) switching position of the switch, the diagnosis can thus be rapidly concluded and normal operation can be started. However, if a fault is detected in the first (or second) switching position of the switch, then the additional diagnosis in the second (or first) switching position of the switch makes it possible unambiguously to differentiate whether the detected fault is a defect of the receiver itself or else a defect of the path between transmitter and receiver, in particular of the excitation element and/or the membrane.

In one embodiment it is therefore provided that the diagnosis unit determines, on the basis of the respective response signals of the receiver in the first and second switching positions of the switch, whether the detected fault is a defect of the receiver or a defect outside the receiver, in particular of the excitation element and/or of the membrane. The detected fault can thus be reliably localized. Specifically, if the fault is detected in both switching positions of the switch, then this fault is a fault of the receiver itself. However, if a fault is no longer established in the next switching position, then the fault was attributable to the excitation element and/or the membrane with high probability. In this case, it is then possible merely to exchange the membrane and/or the excitation element if this is possible with the respective design of the ultrasonic sensor.

The abovementioned embodiments regarding carrying out the diagnosis, in particular with regard to the number of transmission pulses and/or the variation of the gain factor and/or the pulse lengths, may be applicable both to the first and to the second switching position of the switch.

A motor vehicle according to the invention, in particular a car, comprises an ultrasonic sensor device according to the invention.

In a method according to the invention for operating an ultrasonic sensor device of a motor vehicle, ultrasonic waves are transmitted and received by means of a membrane. By means of an excitation element an electrical reception signal is provided upon reception of the ultrasonic waves. By means of the excitation element the membrane is also excited for transmitting the ultrasonic waves. By means of a transmitter electrical transmission pulses are emitted to the excitation element. By means of a receiver the electrical reception signal is received and conditioned. By means of a diagnosis unit, a diagnosis of the receiver is carried out.

The preferred embodiments presented with regard to the ultrasonic sensor device according to the invention and their advantages are correspondingly applicable to the motor vehicle according to the invention and also to the method according to the invention.

Further features of the invention are evident from the claims, the figures and the description of the figures. All features and feature combinations mentioned above in the description and the features and feature combinations mentioned below in the description of the figures and/or shown in the figures alone are usable not only in the combination respectively indicated but also in other combinations or else by themselves.

The invention will now be explained in greater detail on the basis of one preferred exemplary embodiment and with reference to the accompanying drawings.

Figure 1:
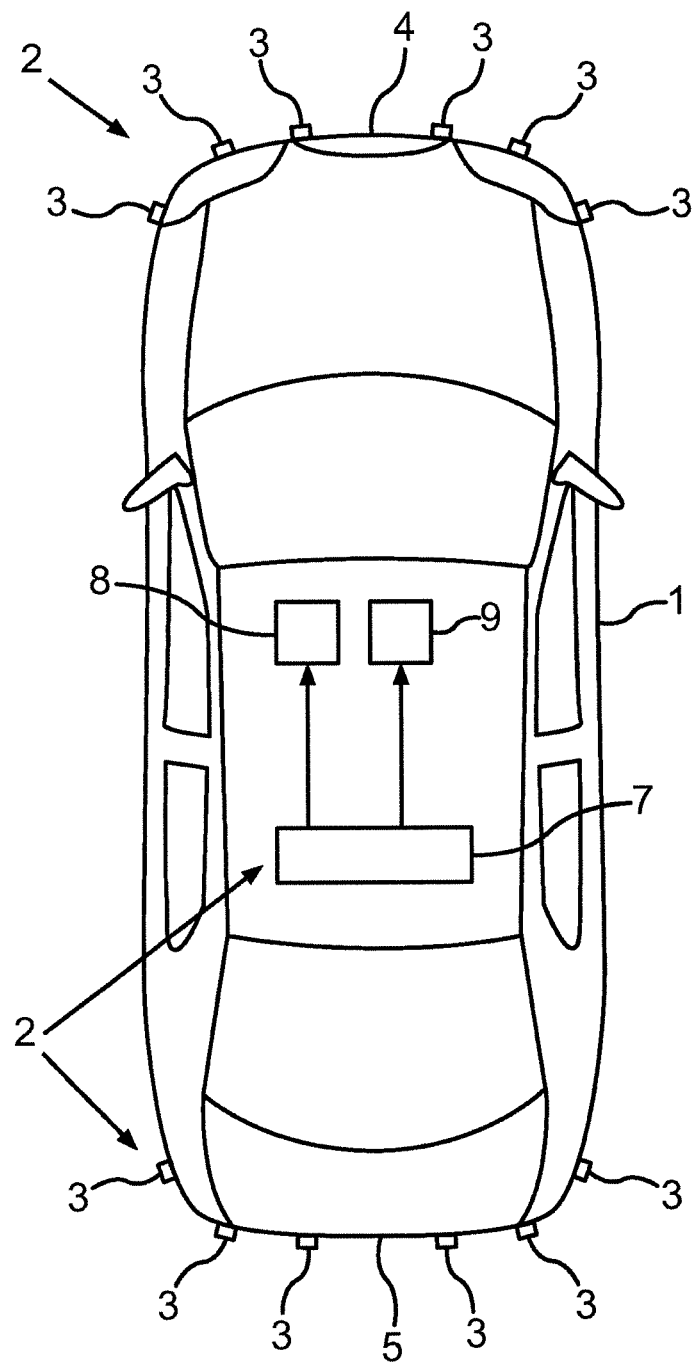
FIG. 1 shows in schematic illustration a motor vehicle comprising an ultrasonic sensor device in accordance with one embodiment of the invention.

A motor vehicle 1 illustrated in FIG. 1 is a car, for example. The motor vehicle 1 comprises an ultrasonic sensor device 2, which is for example a parking aid or a parking assistance system. The ultrasonic sensor device 2 serves for supporting the driver of the motor vehicle 1 when carrying out parking processes. For this purpose, it comprises a multiplicity of ultrasonic sensors 3 arranged in a manner distributed both at the front fender 4 and at the rear fender 5. All the ultrasonic sensors 3 are electrically coupled to a control unit 7 of the ultrasonic sensor device 2. The control unit 7 may contain for example a digital signal processor and/or a microcontroller and serves for driving the ultrasonic sensors 3. The control unit 7 also receives measurement data from the ultrasonic sensors 3 and, depending on these measurement data, determines the distances between the motor vehicle 1 and obstacles situated in its surroundings. Depending on these distances, the control unit 7 can drive for example a loudspeaker 8 and/or an optical display device 9—for example a display. Owing to the loudspeaker 8 and/or the display device 9, the driver is informed of the measured distances.

If appropriate, the ultrasonic sensor device 2 may also be an automatic or semi-automatic parking assistance system by means of which a parking gap is automatically detected and a suitable parking trajectory is automatically calculated, along which the motor vehicle 1 can then be guided into the parking gap automatically or semi-autonomously. In the case of fully automatic parking assistance systems, the ultrasonic sensor device 2 performs both the longitudinal guidance and the transverse guidance of the motor vehicle 1, while in semi-automatic or semi-autonomous systems the ultrasonic sensor device 2 automatically performs only the transverse guidance and thus the steering, while the driver himself/herself has to operate the accelerator pedal and brake. There are also known systems in which the driver himself/herself has to perform both the longitudinal guidance and the transverse guidance, but indications regarding the steering are output by the ultrasonic sensor device 2.

Figure 2:
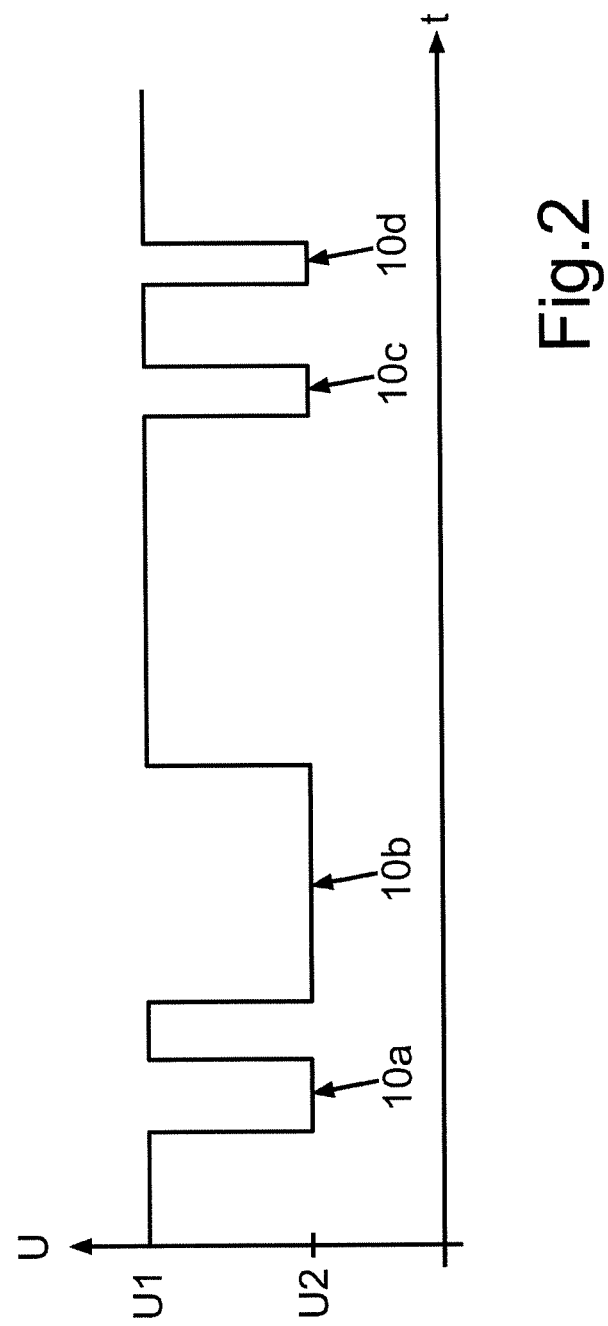
FIG. 2 shows a diagram for elucidating the communication between an ultrasonic sensor and a control unit.

Each ultrasonic sensor 3 is connected to the control unit 7 preferably via a separate line. The communication between the respective ultrasonic sensor 3 and the control unit 7 is carried out via the assigned line by means of electrical voltage. One example of such a communication between an individual ultrasonic sensor 3 and the control unit 7 is illustrated in FIG. 2. The electrical voltage U present on the line between ultrasonic sensor 3 and control unit 7 is plotted on the y-axis. Time t is plotted on the x-axis. In order to transmit messages, the voltage U is changed, here reduced, from a first voltage value U1 to a second voltage value U2. The line is thus biased with the first voltage value U1, wherein, in order to communicate messages, the voltage U is reduced to the second voltage value U2, for example by the line being connected to ground (0 volts). As a result, voltage pulses 10a, 10b, 10c, 10d which contain corresponding messages are generated. The first voltage pulse 10a is generated by the control unit 7 in order to drive the ultrasonic sensor 3 for transmitting a transmission signal in order to carry out a measurement. In reaction to the first voltage pulse 10a, the ultrasonic sensor 3 transmits a transmission signal (ultrasound), which is signalled or communicated to the control unit 7 by the ultrasonic sensor 3 with the second voltage pulse 10b. In this case, the length of the voltage pulse 10b corresponds to the time duration of the membrane oscillation including the decay time. If target echoes are then detected by the ultrasonic sensor 3, the further voltage pulses 10c, 10d are generated in order to communicate this detection to the control unit 7.

In the prior art, the diagnosis of the ultrasonic sensors 3 is carried out on the basis of the pulse length of the respective second voltage pulse 10b, the length of which is dependent on the decay time. However, said voltage pulse 10b does not enable further conclusions to be drawn about internal faults of the ultrasonic sensors 3, in particular about the functioning of respective receivers of the ultrasonic sensors 3, such as the respective gain of an amplifier, for example. If the reception signals are not amplified with the required gain within an ultrasonic sensor 3, this cannot be detected on the basis of the voltage pulse 10b. In this case, target objects cannot be reliably detected.

Figure 3:
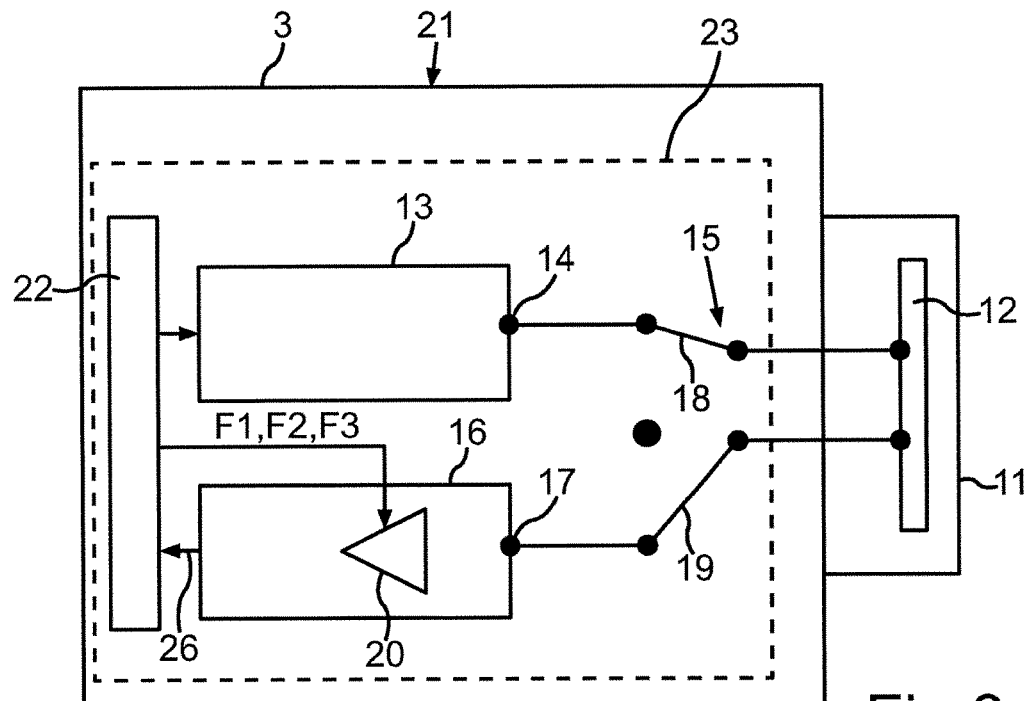
FIGS. 3 and 4 show in schematic illustration in each case an ultrasonic sensor with different positions of a switch.
Figure 4:
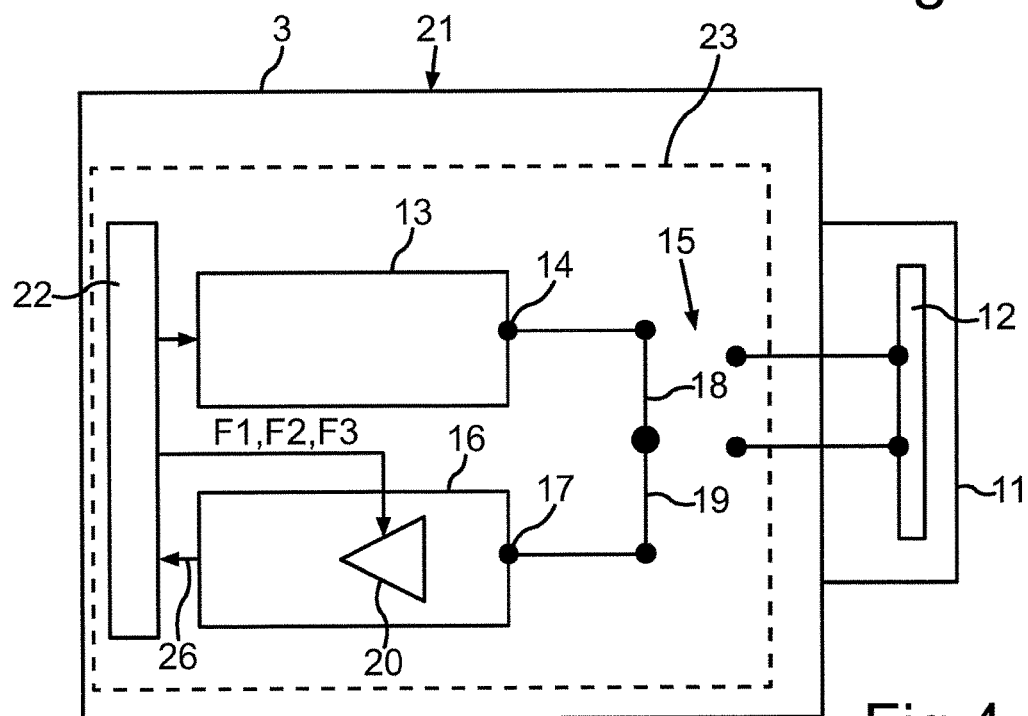

An individual ultrasonic sensor 3 in accordance with one embodiment of the invention is illustrated in FIG. 3. The ultrasonic sensor 3 has a membrane 11, which can be excited for transmitting ultrasonic waves by means of an excitation element 12 in the form of a piezoelectric element. The ultrasonic sensor 3 comprises a transmitter 13, the output 14 of which is electrically coupled to the excitation element 12 via a switch 15. The ultrasonic sensor 3 furthermore comprises a receiver 16, the input 17 of which is likewise electrically coupled to the excitation element 12 via the switch 15. The switch 15 comprises two switching elements 18, 19, via which the transmitter 13 and the receiver 16, respectively, can be coupled to the excitation element 12. The switch 15 is switchable from a first switching position, in which the transmitter 13 and the receiver 16 are electrically connected to the excitation element 12 in parallel, into a second switching position in accordance with FIG. 4, in which the two switching elements 18, 19 are connected to one another and the output of the transmitter 13 is thus connected directly to the input 17 of the receiver 16 whilst bypassing the excitation element 12. In this case, the switch 15 can be realized with transistors, for example.

In order to carry out a diagnosis of the receiver 16, and in particular of an amplifier 20 of the receiver 16, a diagnosis unit 22 is integrated into the ultrasonic sensor 3—namely into a housing 21 of the ultrasonic sensor 3—, which diagnosis unit together with the transmitter 13 and the receiver 16 may also be realized in the form of a common electronic circuit 23, for instance an ASIC. In this case, the diagnosis unit 22 communicates with the control unit 7 and carries out the diagnosis of the receiver 16 on the basis of a control command of the control unit 7. This means that the diagnosis is triggered by the control unit 7 with a corresponding control signal to the diagnosis unit 22. The result of the diagnosis is then communicated from the diagnosis unit 22 to the control unit 7.

During the diagnosis, the switch 15 is firstly kept in the first switching position in accordance with FIG. 3, such that the transmitter 13 and the receiver 16 are electrically coupled to the excitation element 12. The transmitter 13 is then driven for emitting a sequence of transmission pulses 24a, 24b, 24c, that are illustrated schematically in FIG. 5. In this case, the amplitude A is plotted on the y-axis, and time t on the x-axis. The transmission pulses 24a, 24b, 24c are thus emitted successively, wherein with each transmission pulse 24a, 24b, 24c a pulse length 25a, 25b, 25c is increased in comparison with the respective preceding transmission pulse 24a, 24b, 24c. The transmission pulses 24a, 24b, 24c thus have different pulse lengths 25a, 25b, 25c. The diagnosis unit 22 then evaluates a response signal 26 that is output by the receiver 16 in reaction to the transmission pulses 24a, 24b, 24c. With each transmission pulse 24a, 24b, 24c the diagnosis unit 24 increases a gain factor of the amplifier 20: the transmission pulse 24a is generated in the case of a gain factor of the magnitude F1, the transmission pulse 24b in the case of a gain factor F2, and the transmission pulse 24c in the case of a gain factor F3. The following holds true: F1<F2<F3. In particular, it is also provided here that the gain factor F1 corresponds to a minimum gain factor of the amplifier 20 and thus to a minimum which can actually be set at the amplifier 20. Correspondingly, the gain factor F3 may correspond to a maximum or to a maximum possible gain factor. During the emission of the transmission pulses 24a, 24b, 24c, the gain factor of the amplifier 20 is thus increased from the minimum to the maximum in a stepwise manner.

Figure 5:
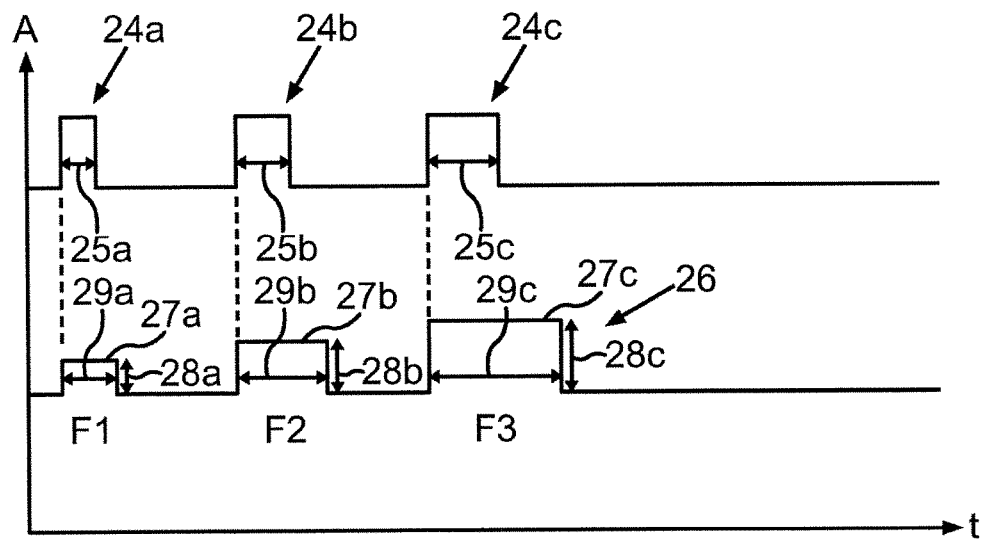
FIGS. 5 and 6 show diagrams for elucidating a diagnosis according to a method according to one embodiment of the invention.

As is evident from FIG. 5, the response signal 26 likewise comprises three voltage pulses 27a, 27b, 27c. These voltage pulses 27a, 27b, 27c have different pulse heights 28a, 28b, 28c on account of the different gain factors F1, F2, F3. In addition, on account of the different pulse lengths 25a, 25b, 25c of the transmission pulses 24a, 24b, 24c, the voltage pulses 27a, 27b, 27c likewise have different pulse lengths 29a, 29b, 29c. On account of the additional decay time of the membrane 11, the pulse lengths 29a, 29b, 29c are a little longer than the respective pulse lengths 25a, 25b, 25c of the corresponding transmission pulses 24a, 24b, 24c.

The diagnosis unit 22 then compares the pulse lengths 29a, 29b, 29c and/or the pulse heights 28a, 28b, 28c of the response signal 26 with stored reference values and can thus diagnose the receiver 16, and in particular the amplifier 20.

Figure 6:
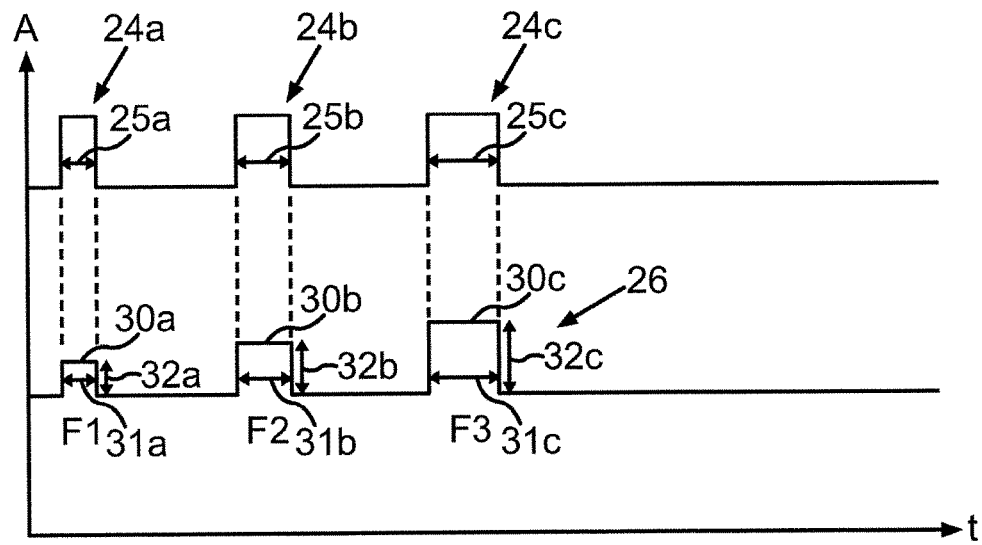

If no fault is established during the diagnosis carried out in the first position of the switch 15, then the diagnosis is ended and the positive result of the diagnosis is communicated to the control unit 7. However, if irregularities in the response signal 26 are ascertained, an additional diagnosis step is carried out, in which the switch 15 is switched into the second switching position in accordance with FIG. 4. Corresponding transmission pulses 24a, 24b, 24c are then emitted directly to the input 17 of the receiver 16. A corresponding response signal 26 of the receiver 16 is illustrated in FIG. 6. Here, too, a plurality of transmission pulses 24a, 24b, 24c—for example three thereof—having different pulse lengths 25a, 25b, 25c are generated, but with the excitation element 12 being bypassed. Correspondingly, with each transmission pulse 24a, 24b, 24c the gain factor of the amplifier 20 is also increased, for example likewise from the minimum F1 to the maximum F3. As is evident from FIG. 6, the response signal 26 in the fault-free case comprises corresponding voltage pulses 30a, 30b, 30c having respective pulse lengths 31a, 31b, 31c which correspond to the respective pulse lengths 25a, 25b, 25c of the assigned transmission pulses 24a, 24b, 24c. On account of the different gain factors F1, F2, F3, the voltage pulses 30a, 30b, 30c have different pulse heights 32a, 32b, 32c. The pulse lengths 21a, 21b, 21c and/or the pulse heights 32a, 32b, 32c are evaluated by the diagnosis unit 22 and in this case compared with stored reference values.

If a fault is then detected during the diagnosis in the second switching position of the switch 15, this fault is a defect of the receiver 16, in particular of the amplifier 20. However, if no fault is established, then this is interpreted as a defect of the membrane 11 and/or of the excitation element 12. The result of the diagnosis is communicated to the control unit 7.

The diagnosis can be performed for example during each initialization of the ultrasonic sensor device 2, i.e. upon each boot process of the control unit 7. The diagnosis is thus carried out basically each time the motor vehicle 1 is started up. However, it is also possible in addition to carry out a check during a measurement as well.

An explanation has been given above of a diagnosis method which involves carrying out firstly a first diagnosis step in the first switching position of the switch 15 and then, if appropriate, a second diagnosis step in the second switching position. However, it is also possible to carry out firstly a diagnosis of the receiver 16 in the second switching position and then, if appropriate, a further diagnosis step in the first switching position.

The invention claimed is:
1. An ultrasonic sensor device for a motor vehicle, comprising:
a membrane for transmitting and receiving ultrasonic waves;
an excitation element for providing an electrical reception signal upon reception of the ultrasonic waves and also for exciting the membrane for transmitting the ultrasonic waves;
a transmitter for emitting electrical pulses to the excitation element;
a receiver for receiving and conditioning the electrical reception signal,
wherein the receiver comprises an amplifier for amplifying the electrical reception signal; and
a diagnosis unit for carrying out a diagnosis of the receiver and in the process to check the receiver with regard to its functionality,
wherein the diagnosis unit, in the context of the diagnosis, is configured to:
drive the transmitter for outputting at least one transmission pulse,
evaluate a response signal output by the receiver in response to the at least one transmission pulse,
check the amplifier with regard to functionality of the amplifier in the context of the diagnosis,
check the amplifier with regard to the magnitude of a gain factor in the context of the diagnosis, and
upon driving the transmitter for outputting the at least one transmission pulse, vary the gain factor of the amplifier of the receiver with each transmission pulse, and to check the response signal of the receiver, said response signal being output in reaction to the at least one transmission pulse, with regard to the magnitude of the gain factor.

2. The ultrasonic sensor device according to claim 1, further comprising a control unit and an ultrasonic sensor separate from the control unit and having a sensor housing, in which the transmitter, the receiver and the diagnosis unit are arranged, wherein the diagnosis unit is designed to communicate a result of the diagnosis of the receiver to the control unit.

3. The ultrasonic sensor device according to claim 1, wherein the diagnosis unit is designed, in the context of the diagnosis, to drive the transmitter for outputting at least two transmission pulses successively.

4. The ultrasonic sensor device according to claim 3, wherein the at least two transmission pulses have different pulse lengths, wherein the diagnosis unit is designed to check pulses of the response signal of the receiver, said response signal being output in reaction to the at least two transmission pulses, with regard to their pulse lengths.

5. The ultrasonic sensor device according to claim 1, wherein the diagnosis unit is designed to set the gain factor to a minimum for at least one transmission pulse of the transmitter and/or the gain factor to a maximum for at least one transmission pulse of the transmitter.

6. The ultrasonic sensor device according to claim 1, wherein the diagnosis unit is designed to drive the transmitter for emitting the at least one transmission pulse to the excitation element while the receiver is electrically coupled to the excitation element.

7. The ultrasonic sensor device according to claim 1, further comprising a switch which is switchable between a first switching position, in which the transmitter and the receiver are electrically coupled to the excitation element, and a second switching position, in which the receiver is electrically coupled to the transmitter while bypassing the excitation element, wherein the diagnosis unit is designed, in the second switching position of the switch, to drive the transmitter for emitting the at least one transmission pulse to the receiver.

8. The ultrasonic sensor device according to claim 7, wherein the diagnosis unit is designed, when carrying out the diagnosis, firstly to drive the transmitter for emitting at least one transmission pulse in one switching position, in particular in the first switching position, of the switch and only after detection of a fault to drive the transmitter for emitting at least one transmission pulse also in the other switching position, in particular the second switching position, of the switch.

9. The ultrasonic sensor device according to claim 8, wherein the diagnosis unit is designed to determine, on the basis of the respective response signals of the receiver in the first and second switching positions of the switch, whether the detected fault is a defect of the receiver or a defect outside the receiver of the excitation element and/or of the membrane.

10. A motor vehicle comprising an ultrasonic sensor device according to claim 1.

11. A method for operating an ultrasonic sensor device of a motor vehicle, comprising:
transmitting, by a membrane, ultrasonic waves;
receiving the ultrasonic waves, by an excitation element;
providing an electrical reception signal upon reception of the ultrasonic waves;
exciting the membrane for transmitting the ultrasonic waves, by a transmitter;
emitting electrical pulses to the excitation element;
by a receiver, receiving and conditioning the electrical reception signal,
amplifying the electrical reception signal by an amplifier in the receiver; and
carrying out, by a diagnosis unit of the ultrasonic sensor device a diagnosis of the receiver and checking the functionality of the receiver in the process, wherein the diagnosis by the diagnosis unit, comprises:
driving the transmitter for outputting at least one transmission pulse,
evaluating a response signal output by the receiver in response to the at least one transmission pulse,
checking the amplifier with regard to functionality of the amplifier in the context of the diagnosis,
checking the amplifier with regard to the magnitude of a gain factor in the context of the diagnosis, and
upon driving the transmitter for outputting the at least one transmission pulse, varying the gain factor of the amplifier of the receiver with each transmission pulse, and checking the response signal of the receiver, said response signal being output in reaction to the at least one transmission pulse, with regard to the magnitude of the gain factor.

* * * * *